US010417273B2

(12) United States Patent
Ashour et al.

(10) Patent No.: US 10,417,273 B2
(45) Date of Patent: Sep. 17, 2019

(54) MULTIMEDIA ANALYTICS IN SPARK USING DOCKER

(71) Applicant: International Business Machines Corporation, Armonk, NY (US)

(72) Inventors: Gal Ashour, Yoqneam (IL); Ophir Azulai, Tivon (IL); Roy Levin, Zihron Yakov (IL)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 15/398,728

(22) Filed: Jan. 5, 2017

(65) Prior Publication Data

US 2018/0189296 A1 Jul. 5, 2018

(51) Int. Cl.
*G06F 16/41* (2019.01)
*G06F 16/43* (2019.01)
*G06F 16/44* (2019.01)
*G06F 16/9535* (2019.01)

(52) U.S. Cl.
CPC .............. *G06F 16/44* (2019.01); *G06F 16/41* (2019.01); *G06F 16/43* (2019.01); *G06F 16/9535* (2019.01)

(58) Field of Classification Search
CPC ...... G06F 16/44; G06F 16/43; G06F 16/9535; G06F 16/41
See application file for complete search history.

(56) References Cited

U.S. PATENT DOCUMENTS

| 2013/0297624 | A1* | 11/2013 | Raghunathan | .......... G06F 16/10 707/752 |
| 2013/0317803 | A1* | 11/2013 | Manley | ............... G06F 17/5009 703/21 |
| 2015/0066646 | A1 | 3/2015 | Sriharsha et al. | |
| 2015/0256481 | A1 | 9/2015 | Turovsky et al. | |

(Continued)

OTHER PUBLICATIONS

Rad et al. "Secure image processing inside cloud file sharing environment using lightweight containers," 2015 IEEE International Conference on Imaging Systems and Techniques (IST), IEEE, 2015. (Year: 2015).*

(Continued)

*Primary Examiner* — Jay A Morrison
(74) *Attorney, Agent, or Firm* — G. E Ehrlich

(57) ABSTRACT

A computer implemented method of mapping multimedia analytics of multimedia objects into a resilient distributed dataset (RDD), comprising one or more processors adapted to obtain an RDD of a cluster computing framework executed by a cluster comprising a plurality of computing nodes, the RDD comprises a plurality of entries each comprising a pointer to one of a plurality of multimedia objects stored in a shared storage, instruct each of a plurality of framework tasks executed by at least some members of the cluster to apply a docker operator for retrieving and executing one of a plurality of multimedia containers each associated with a respective one of the multimedia objects and comprising a multimedia processing algorithm for processing the respective multimedia object, receive from the framework tasks multimedia analytics results generated simultaneously by the multimedia containers and map the multimedia analytics results into the RDD.

17 Claims, 2 Drawing Sheets

(56) References Cited

U.S. PATENT DOCUMENTS

Figure 1:
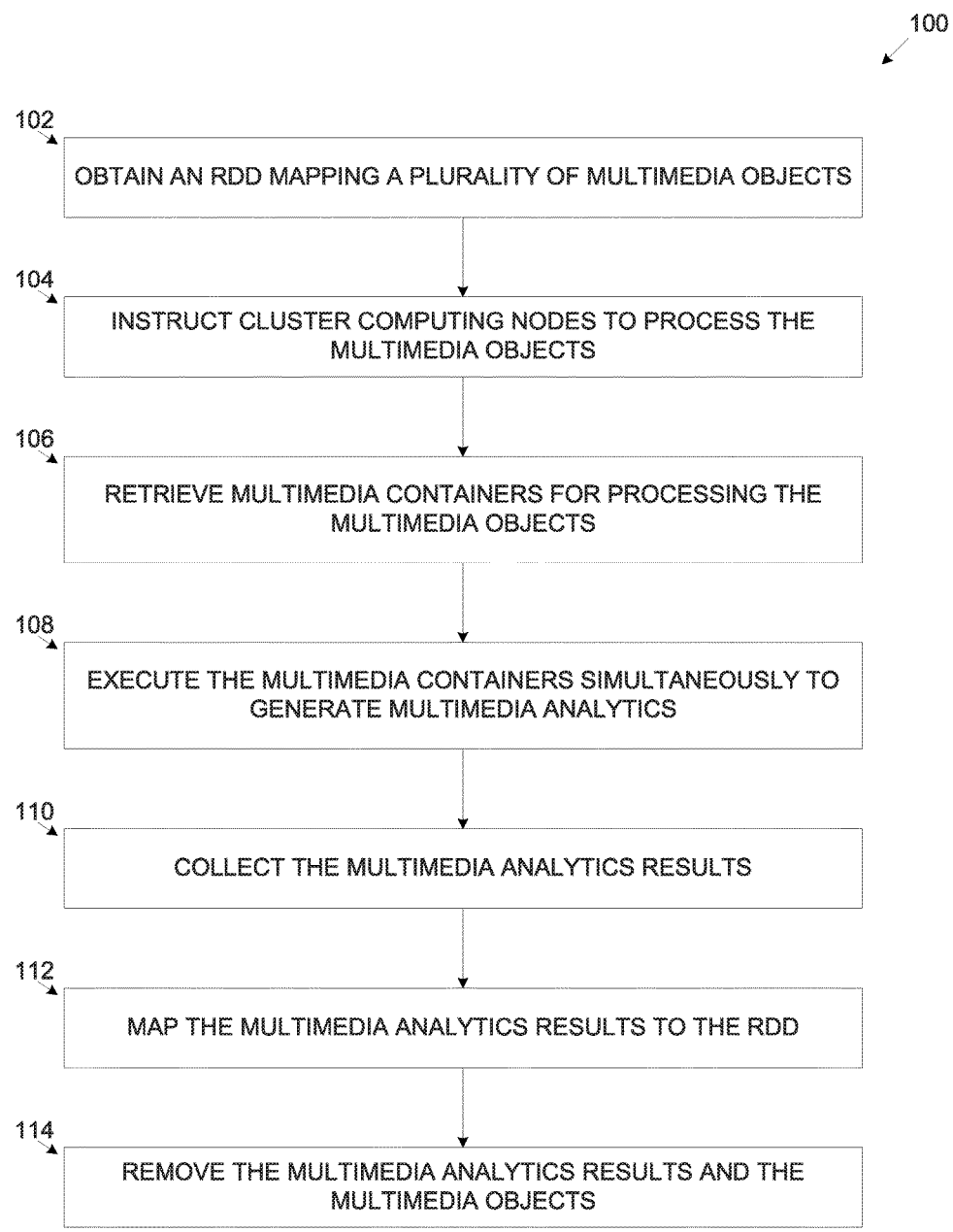

2017/0316485 A1* 11/2017 Magnusson ........ G06Q 30/0631

OTHER PUBLICATIONS

Docker Documentation, Docker run reference, archived Nov. 7, 2015 on archive.org, https://web.archive.org/web/20151107005612/https://docs.docker.com/engine/reference/commandline/run/ (Year: 2015).*

How to use your own Registry, by Sam Alba, Jul. 19, 2013, https://blog.docker.com/2013/07/how-to-use-your-own-registry/. (Year: 2013).*

Docker Documentation, Docker cp reference, archived Nov. 7, 2015 on archive.org, https://web.archive.org/web/20151107015258/https://docs.docker.com/engine/reference/commandline/cp/ (Year: 2013).*

* cited by examiner

MULTIMEDIA ANALYTICS IN SPARK USING DOCKER

FIELD AND BACKGROUND OF THE INVENTION

The present invention, in some embodiments thereof, relates to mapping multimedia analytics into a cluster computing framework and, more particularly, but not exclusively, to mapping multimedia analytics into a cluster computing framework by extending the cluster computing framework with multimedia processing containers.

Multimedia analytics is a rapidly increasing research area that combines multimedia analysis and visual analytics for analyzing large-scale multimedia collections of multimedia items (objects), in particular, images, video and audio.

The multimedia analytics is directed to harvest useful knowledge, comprehend and articulate the big picture and/or representing the context, content, and relationships extracted by analyzing the multimedia collections. The multimedia analytics may be applied to understand, mine and utilize the large multimedia collections in order to solve real-world problems.

The technological advancements made in recent years have enabled individuals to record, create, collect and distribute multimedia items thus leading to an ever increasing size and complexity of the multimedia collections.

The extreme increase in the multimedia collections coupled with the desire to harvest useful information from these collections leads to the need to create advanced multimedia analytics methods and systems.

SUMMARY OF THE INVENTION

According to an aspect of some embodiments of the present invention there is provided a computer implemented method of mapping multimedia analytics of multimedia objects into a resilient distributed dataset (RDD), comprising one or more hardware processor adapted to:

Obtain an RDD of a cluster computing framework executed by a cluster comprising a plurality of computing nodes. The RDD comprises a plurality of entries. Each of the plurality of entries comprises a pointer to one of a plurality of multimedia objects stored in a shared storage.

Instruct each of a plurality of framework tasks executed by at least some members of the cluster to apply a docker operator for retrieving and executing one of a plurality of multimedia containers. Each of the plurality of multimedia containers is associated with a respective one of the plurality of multimedia objects and comprising a multimedia processing algorithm for processing the respective multimedia object.

Receive, from the plurality of framework tasks, multimedia analytics results generated simultaneously by the plurality of multimedia containers.

Map the multimedia analytics results into the RDD.

According to some embodiments of the invention, the docker operator is an extension added to the cluster computing framework to support generation of the multimedia analytics for the plurality of multimedia objects.

According to some embodiments of the invention, the docker operator is used by a respective one of the plurality of framework tasks to interpret the pointer and copy the respective multimedia object from the shared storage to a local storage of a respective one of the at least some members prior to processing the respective multimedia object such that the respective multimedia object is locally available to the associated multimedia container.

According to some embodiments of the invention, the docker operator is used by a respective one of the plurality of framework tasks to retrieve an appropriate one of the plurality of multimedia containers from a docker registry stored in the shared storage. The appropriate multimedia container is adapted for processing the respective multimedia object.

According to some embodiments of the invention, the docker operator is used for mapping the multimedia analytics results into the RDD using a textual format to allow the multimedia analytics results to be further processed through a processing flow of the cluster computing framework adapted for text objects.

According to some embodiments of the invention, the cluster computing framework is Apache Spark.

According to some embodiments of the invention, each of the plurality of multimedia objects is a member of a group consisting of: an image, a sequence of images, a video clip, an audio playback and a combination of any two members thereof.

According to some embodiments of the invention, each of the plurality of multimedia objects is a binary file.

According to some embodiments of the invention, the pointer is a path in the shared storage.

Optionally, according to some embodiments of the invention, one or more of the plurality of multimedia objects are segmented to a plurality of overlapping multimedia segments. Each of the plurality of multimedia segments has a fixed pre-defined size. Each of the plurality of multimedia segments is assigned an entry in the RDD and processed by one of the plurality of multimedia containers. The assigned entry is extended to include indexing information of the respective multimedia segment with respect to its respective multimedia object.

Optionally, according to some embodiments of the invention, the segmenting of the one or more multimedia object is done simultaneously with obtaining the RDD.

According to some embodiments of the invention, the multimedia analytics results generated for the plurality of multimedia segments are aggregated using the indexing information to produce overall multimedia analytics results for the respective one or more multimedia object.

Optionally, according to some embodiments of the invention, one or more of the plurality of multimedia objects are split to a plurality of multimedia scenes created by analyzing a content of the one or more multimedia object and segmenting the one or more multimedia object to the plurality of multimedia scenes according to the content. Each of the plurality of multimedia scenes is assigned an entry in the RDD and processed by one of the plurality of multimedia containers. The assigned entry is extended to include indexing information of the each multimedia segment with respect to the one or more multimedia object.

According to some embodiments of the invention, the multimedia analytics results generated for the plurality of multimedia scenes are aggregated using the indexing information to produce overall multimedia analytics results for the one or more multimedia object.

According to some embodiments of the invention, each of the plurality of multimedia containers is an instance of a pre-created executable image and is capable of executing on each of the plurality of computing nodes. The pre-created executable image comprises a complete independent execution environment including all execution dependencies of the multimedia processing algorithm.

According to some embodiments of the invention, each of the plurality of multimedia containers is independent of the cluster computing framework. Each multimedia container operates using a file to file interface in which the multimedia container receives the respective multimedia object as an input and provides the multimedia analytics as a text output.

According to some embodiments of the invention, the processing algorithm provides a command line interface (CLI) for receiving processing commands embedded in the each multimedia container for the associated multimedia object.

According to an aspect of some embodiments of the present invention there is provided a system for mapping multimedia analytics of multimedia objects into a resilient distributed dataset (RDD), comprising a cluster comprising a plurality of computing nodes and one or more hardware processor adapted for executing code stored in a program store, the code comprising:

Code instructions for obtaining an RDD of a cluster computing framework executed by a cluster comprising a plurality of computing nodes. The RDD comprises a plurality of entries. Each of the plurality of entries comprises a pointer to one of a plurality of multimedia objects stored in a shared storage of the cluster.

Code instructions for instructing each of a plurality of framework tasks executed by at least some members of the cluster to apply a docker operator added to the cluster computing framework for retrieving and executing one of a plurality of multimedia containers. Each of the plurality of multimedia containers is associated with a respective one of the plurality of multimedia objects and comprising a multimedia processing algorithm adapted for processing the respective multimedia object.

Code instructions for receiving, from the plurality of framework tasks, multimedia analytics results generated simultaneously by the plurality of multimedia containers executed by the at least some members.

Code instructions for mapping the multimedia analytics results into the RDD.

According to an aspect of some embodiments of the present invention there is provided a computer program product for mapping multimedia analytics of multimedia objects into a resilient distributed dataset (RDD), comprising:

A non-transitory computer readable storage medium.

First program instructions to obtain an RDD of a cluster computing framework executed by a cluster comprising a plurality of computing nodes. The RDD comprises a plurality of entries. Each of the plurality of entries comprises a pointer to one of a plurality of multimedia objects stored in a shared storage of a cluster comprising a plurality of computing nodes.

Second program instructions to instruct each of a plurality of framework tasks executed by at least some members of the cluster to apply a docker operator added to the cluster computing framework for retrieving and executing one of a plurality of multimedia containers. Each of the plurality of multimedia containers is associated with a respective one of the plurality of multimedia objects and comprising a multimedia processing algorithm adapted for processing the respective multimedia object.

Third program instructions to receive, from the plurality of framework tasks, multimedia analytics results generated simultaneously by the plurality of multimedia containers executed by the at least some members.

Fourth program instructions to map the multimedia analytics results into the RDD.

Wherein the first, second, third and fourth program instructions are executed by one or more processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
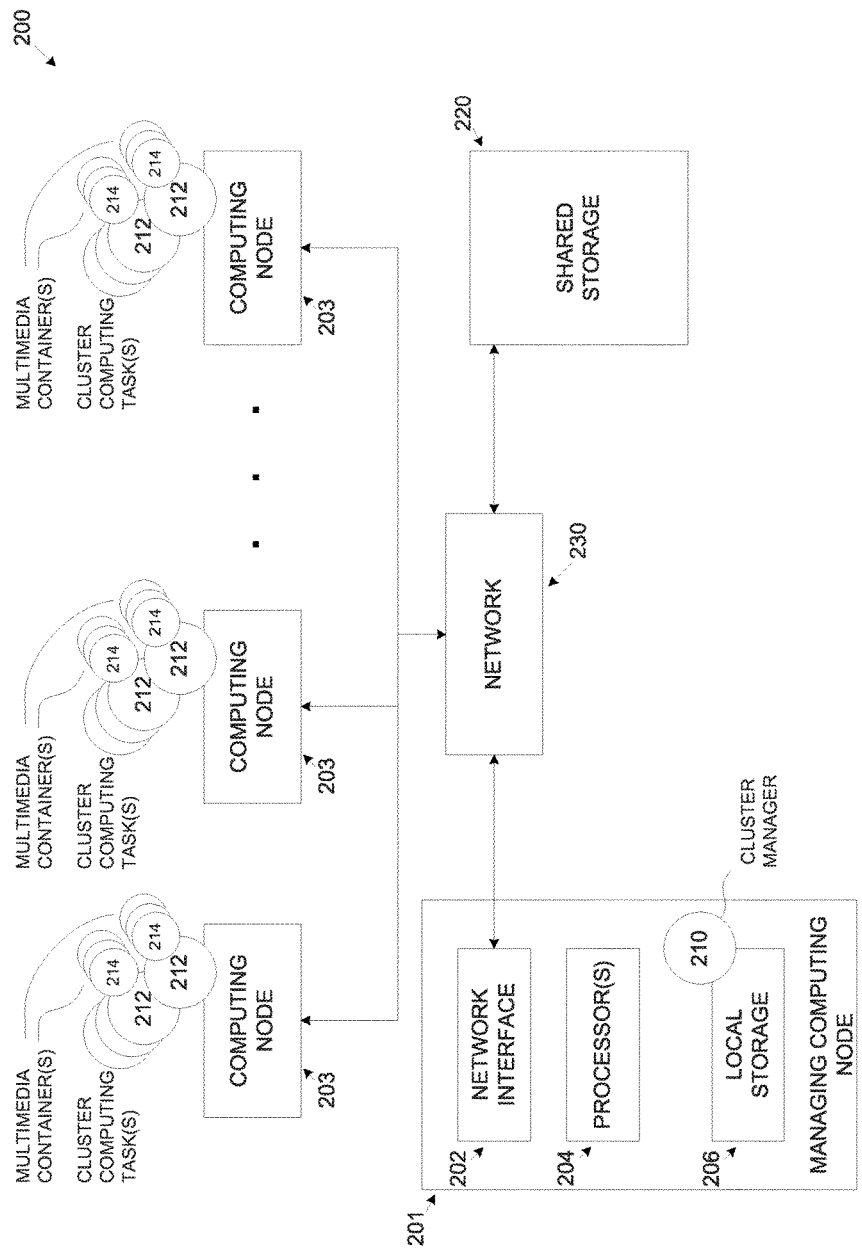

In the drawings:

FIG. 1 is a flowchart of an exemplary process for mapping multimedia analytics of multimedia objects into an RDD defined by a cluster computing framework, according to some embodiments of the present invention; and FIG. 2 is a schematic illustration of an exemplary system for mapping multimedia analytics of multimedia objects into an RDD defined by a cluster computing framework.

DESCRIPTION OF SPECIFIC EMBODIMENTS OF THE INVENTION

The present invention, in some embodiments thereof, relates to mapping multimedia analytics into a cluster computing framework and, more particularly, but not exclusively, to mapping multimedia analytics into a cluster computing framework by extending the cluster computing framework with multimedia processing containers.

According to some embodiments of the present invention, there are provided methods, systems and computer program products for generating and mapping multimedia analytics for a plurality of multimedia objects by extending an existing cluster computing framework, for example, Apache Spark.

The cluster computing framework may be executed by a computing cluster comprising a plurality of computing nodes (physical and/or virtual) for generating, processing and/or manipulating big data analytics providing a platform independent infrastructure interface, for example, Java. The cluster computing framework uses a resilient distributed dataset (RDD) for mapping data objects throughout the framework processing flow for creating the big data analytics. Typically, the cluster computing framework, i.e. the RDD and the processing flow, may be designed to process text objects, for example, words, phrases, sentences, text paragraphs and/or the like.

The cluster computing framework is extended to allow processing of binary objects, in particular multimedia objects, for example, images, images sequences, video clips, audio playbacks, combinations of any two or more multimedia objects thereof and/or the like. The extension may be applied to both the RDD and/or the processing flow. The RDD is constructed such that each entry maps an associated multimedia object through a pointer and/or a path to the multimedia object file rather than containing the multimedia object itself as may typically be done for the text objects. The cluster computing framework is further extended with a docker operator adapted for managing and executing a respective multimedia container (docker) for processing each of the multimedia objects pointed by the RDD. Each of a plurality of cluster computing framework tasks executed by at least some of the plurality of computing nodes may apply the docker operator for retrieving (pulling) a respective multimedia container comprising a complete and independent execution environment for one or more multimedia processing algorithms used to process the associated multimedia object, for example, image processing, voice processing, speech processing and/or the like. The multimedia container may be an instance of a pre-created (created offline in advance) executable image for executing the multimedia processing algorithm(s). The multimedia container may include execution dependencies, libraries and/or the like to allow secure isolated execution of the multimedia processing algorithm(s) on the platform independent infrastructure of the cluster computing framework.

The plurality of cluster computing framework tasks are instructed to execute simultaneously their assigned multimedia container(s) to produce multimedia analytics. The results of the multimedia analytics may be collected and mapped back into the RDD using the docker operator. The docker operator maps the multimedia analytics results using a textual format to comply with the cluster computing framework interface designed for text objects. Once arranged to map the multimedia analytics in the textual format, the RDD may be further analyzed, processed and/or manipulated using the cluster computing framework inherent processing flow and capabilities to provide the multimedia big data analytics.

Extending the cluster computing framework to support binary objects, in particular multimedia objects may present significant advantages. Using the cluster computing framework, for example, the Apache Spark to generate the multimedia big data analytics may be very useful when large numbers of multimedia objects are concerned. By extending the already available industry standard cluster computing framework to support the multimedia objects, the inherent already available methodologies, capabilities and/or tools of the cluster computing framework may be harnessed for processing the multimedia objects to collect, generate and/or manipulate multimedia big data analytics. While a portion of the cluster computing framework processing flow is extended, most of the processing flow may be applied as is for the multimedia objects analytics results thus taking advantage of the existing framework avoiding the need to develop a new framework for multimedia objects analytics.

Applying the cluster computer framework to the multimedia objects may present two major problems. The first problem relates to the interface of the cluster computing framework that may typically be designed for textual representations of the processed data objects, for example, the Apache Spark employs a pipe operator for processing the RDD comprising textual data using external applications and by textual interface. This is naturally not the case with the multimedia objects that are binary objects encapsulated in, for example, binary files and may require multimedia processing using one or more multimedia processing algorithms Another problem is that multimedia processing algorithms and/or their supporting library(s) may require using many $3^{rd}$ party native libraries such as, for example, FFmpeg. This may present major difficulties to seamlessly and efficiently integrate the multimedia processing algorithm(s) and/or the native supporting library(s) into the cluster computing framework since the multimedia processing algorithm(s) and/or the native supporting library(s) may need adapted for installation, execution and/or instantiation on each of the cluster's computing nodes. Moreover, repeated multimedia processing algorithm(s) and/or supporting library(s) installation and/or executions that may be dependent on each other may be required, further complicating the integration of the native software into the cluster computing framework.

Some existing methods may use code wrapper(s) for packaging the multimedia processing algorithm(s) with their supporting libraries and distributing the wrapped package to the computing nodes. For example, the library(s) may be wrapped for Java using Java Native Interface (JNI) in order to allow the native software multimedia processing algorithm(s) and/or the supporting libraries to interface the Java platform of the computing nodes. The wrapped code may then be distributed to the computing nodes using an UBER Java Archive (UBER-JAR) file. However, wrapping the native software using the JNI may be very time consuming and in some scenarios not practical. Moreover, it may be impossible to bundle some of the native multimedia processing algorithm(s) and/or their supporting libraries in the UBER-JAR file. Furthermore, the UBER-JAR file itself may become platform specific as it may need to execute native software code, for example, a Dynamic Link Library, a shared object and/or the likes.

Applying the extension to the cluster computing framework may resolve the first problem by extending the RDD to support binary files, in particular multimedia files. By using the pointers and/or paths of the multimedia object file in the RDD, the cluster computing framework may be extended to support the multimedia files without altering the fundamental execution methodology(s), concepts and/or functions of the cluster computing framework that may typically be designed for text objects processing. The extension of the cluster computing framework with the docker operator for interpreting the new construction of the RDD may allow the cluster computing framework tasks to manage the multimedia objects, launch the appropriate multimedia containers and map the multimedia analytics results to the textual format supported by the cluster computing framework. The multimedia analytics results are therefore adapted for the standard format supported by the cluster computing framework and may therefore be processed through the processing flow of the cluster computing framework as text objects are normally processed.

The second problem may be resolved by creating offline (in advance) the multimedia container (docker) comprising a complete image for secure and isolated execution of the multimedia algorithm(s) for processing the multimedia objects over the platform independent infrastructure, for example, Java. The pre-created multimedia container may be an image, comprising a complete execution environment including, for example, an Operating System (OS), a file system, multimedia algorithm(s), supporting libraries and/or the like. The multimedia container image interacts with the OS executed by the hosting computing node such that the multimedia container is independent of the hardware architecture of the hosting computing node. Furthermore, the multimedia container is file to file oriented, i.e. it receives the respective multimedia object file(s) as an input and provides the generated multimedia analytics as a text output. This may further make the media container independent of the hardware architecture of the hosting computing node. The data exchange between the media container and the cluster computing framework tasks may be done sing for example, docker volumes comprising one or more storage objects, for example, a directory, a file and/or the like that may be accessible for both the media container and the cluster computing framework tasks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process for mapping multimedia analytics of multimedia objects into an RDD defined by a cluster computing framework, according to some embodiments of the present invention. A process 100 may be executed to generate and map multimedia analytics for one or more of a plurality of multimedia objects by extending an existing cluster computing framework, for example, Apache Spark. The cluster computing framework may typically be used for generating, processing and/or manipulating big data analytics for data objects available in one or more text formats. The cluster computing framework may be applied by a computing cluster comprising a plurality of computing nodes providing a platform independent infrastructure interface, for example, Java. The cluster computing framework may use an RDD for mapping data objects throughout the framework processing flow for creating the big data analytics. The processing flow of the cluster computing framework, for example, a pipe operator in the Apache Spark may typically be used for text objects such that the RDD may map text objects, for example, words, phrases, sentences, text paragraphs and/or the like. The process 100 extends the cluster computing framework such that the RDD supports binary objects, in particular multimedia objects, for example, images, images sequences, video clips, audio playbacks, combinations of any two or more multimedia objects thereof and/or the like. The processing flow of the cluster computing framework may be further extended with an operator for managing and handling the binary files, for example, the Apache Spark may be extended with a docker operator.

The RDD may include one or more entries each mapping an associated one of the multimedia objects. The RDD is extended such that each of the entries may not include the multimedia object itself but rather a pointer in a shared storage of the computing cluster pointing to the associated multimedia object. For each of the multimedia objects pointed by the RDD, a respective multimedia container is retrieved (pulled) using the docker operator. The multimedia container (docker) allows secure isolated execution by providing an entire execution environment of one or more multimedia processing algorithms for processing the associated multimedia object, for example, image processing, voice processing, speech processing and/or the like. Each of the multimedia containers may be an instance of a pre-created (offline) executable image of one or more multimedia processing algorithms including execution dependencies, libraries and/or the like to allow secure isolated execution of the multimedia container on the platform independent infrastructure of the executing computing node. The multimedia containers may be stored in a docker registry repository accessible for the cluster and may be retrieved (pulled) for execution by one or more of a plurality of cluster computing framework tasks executed by at least some of the computing nodes of the cluster. This may allow the cluster computing framework to handle the multimedia objects with no need to adapt the cluster computing framework itself for specific multimedia object(s).

The plurality of cluster computing framework tasks may be instructed to execute a respective one of the multimedia containers to produce multimedia analytics for an associated multimedia object. The plurality of cluster computing framework tasks may be instructed to execute simultaneously their respective multimedia containers. The results of the multimedia analytics may be collected and mapped back into the RDD using the docker operator. The docker operator maps the multimedia analytics results using a textual format to comply with the cluster computing framework interface typically designed for text objects.

Once arranged to map the multimedia analytics in the textual format, the RDD may be further analyzed, processed and/or manipulated using the cluster computing framework inherent processing flow and capabilities to provide the multimedia big data analytics.

Reference is also made to FIG. 2, which is a schematic illustration of an exemplary system for mapping multimedia analytics of multimedia objects into an RDD defined by a cluster computing framework, according to some embodiments of the present invention. A system 200 for executing a multimedia analytics mapping process such as the process 100 includes a computing cluster comprising a plurality of computing nodes 203, for example, a server, a processing node, a virtual machine and/or the like managed by a managing computing node 201. The managing computing node 201 comprises a network interface 202 for connecting to one or more networks 230, a processor(s) 204 and a local storage 206. Each of the computing nodes 203 may be constructed similarly to the managing computing node 201, i.e. with a network interface such as the network interface 202, a processor(s) such as the processor(s) 204 and a local storage such as the local storage 206. In some embodiments, the managing computing node 201 is integrated with one or more of the computing nodes 203. The computing cluster may be geographically co-located and/or distributed over a plurality of locations. The computing nodes 203 and/or 201 may communicate with each other over the network 230, for example, a LAN, a WAN, the internet and/or the like. Additionally and/or alternatively, the network 230 comprises one or more fabrics facilitating the infrastructure of computing cluster and/or a part thereof, for example, Infini-Band. The processor(s) 204 comprises one or more one or more processors 204 (homogenous or heterogeneous), which may be arranged for parallel processing, as clusters and/or as one or more distributed core processing units. Each of the processor(s) may execute one or more software modules wherein a software module refers to a plurality of program instructions stored in a storage medium such as the local storage 206 and executed by the processor(s) 204. The local storage 206 may include one or more non-transitory storage devices, for example, a hard drive, a Flash array, an attached storage media and/or the like. The local storage 206 may further include one or more volatile storage devices, for example, a random access memory (RAM) to which one or more software modules may be loaded from one or more of the non-transitory storage devices and/or from one or more remote locations over the network 230.

The computing cluster includes and/or connects to a shared storage 220 comprising one or more networked storage devices attached to the network 230, for example, a storage server, a Network Attached Storage (NAS) and/or the like. The computing nodes 203 and/or the managing g computing node 201 may access the shared storage 220 through the network 230. The shared storage 220 may apply one or more file systems for arranging and/or storing the multimedia object files, for example, Hadoop Distributed File system (HDFS), Swift and/or the like.

The managing computing node 201 may execute one or more software modules, for example, a cluster manager 210 for managing the computing cluster executing the cluster computing framework, for example, the Apache Spark. At least some of the processing nodes 203 may each execute one or more cluster computing framework tasks 212 for generating at least a portion of the big data analytics. The cluster computing framework tasks 212 may retrieve (pull) for execution one or more multimedia containers 214 each providing and/or defining an execution environment appropriate for processing an associated multimedia object.

In some embodiments, one or more of the computing nodes 203 are virtual machines, for example, a Java Virtual Machine (JVM) such that one or more virtual machines may be executed by the same physical hardware processing platform, for example, a server, a processing node and/or the like. Each of the virtual machines may execute one or more of the cluster computing framework tasks 212 and each of the cluster computing framework tasks 212 may be assigned to execute one or more of the multimedia containers 214.

As shown at 102, the cluster manager 210 obtains the RDD comprising a plurality of entries each associated with one of the plurality of multimedia objects. Each of the entries includes a pointer in the shared storage 220 pointing to an associated multimedia object. Each of the plurality of multimedia objects may be a binary file with the pointer, for example, a path of the binary file in the file system(s) of the shared storage 220. The RDD obtained by the cluster manager 210 may be pre-created and stored in storage, for example, the shared storage 220 and/or the local storage 206 of the managing computing node 201. Optionally, the cluster manager 210 creates the RDD according to instructions and/or information provided by one or more users and/or automated tools defining the scope of the required big data multimedia analytics and/or the source multimedia objects.

The cluster manager 210 may partition the RDD such that each partition holds as many multimedia objects paths as are processed by a single task of the computing cluster framework. This basically determines the level of parallelism applied for processing the plurality of multimedia objects by the computing nodes 203.

Optionally, one or more of the multimedia objects are segmented to a plurality of multimedia segments of equal fixed pre-defined size. The plurality of multimedia segments may include an overlap section at the beginning (with a preceding multimedia segment) and/or the end (with a succeeding multimedia segment) of each multimedia segment to properly cover the segmented multimedia object. Each of the multimedia segments may be assigned an entry in the RDD such that it may be processed separately to produce its multimedia analytics. Each of the RDD entries assigned for each of the multimedia segments may include indexing information indicating, for example, a location of the multimedia segment within the segmented multimedia object, a description of the overlapping section(s) and/or the like. Segmenting the multimedia object(s) may be done by the cluster manager 210 and/or by one or more other software modules, for example, a multimedia segmenting module. Segmenting the multimedia object(s) may be done in parallel to other steps of the process 100 such while current multimedia object(s) are processed, following multimedia object(s) may be split and the RDD may be updated with entries associated with the newly created multimedia segments.

Optionally, one or more of the multimedia objects are split to a plurality of multimedia scenes according to analysis of the content of the respective multimedia object. The multimedia scenes may be created by analyzing the content of the respective multimedia object and segmenting it to the multimedia scenes such that each multimedia scene includes content that may be distinct from the content of a preceding multimedia scene and/or a following multimedia scene. For example, assuming a video multimedia object of live music concert event. The video multimedia object may include a plurality of distinct images sequences, for example, captured from different viewing angles, depicting different objects of the event (e.g. an artist, a stage, an audience, etc.) and/or the like. The video multimedia object may be segmented such that each distinct images sequence forms one of the multimedia scenes. Each of the multimedia segments may be assigned an entry in the RDD such that it may be processed separately to produce its multimedia analytics. Each of the RDD entries assigned for each of the multimedia scenes may include indexing information indicating, for example, a location of the multimedia scene within the multimedia object and/or the like. Splitting the multimedia object(s) to the multimedia scenes may be done by the cluster manager 210 and/or by one or more other software modules, for example, a multimedia splitter using one or more multimedia content analysis tools and/or algorithms as known in the art.

As shown at 104, the cluster manager 210 instructs (assigns) one or more of the cluster computing framework task 212 executed by at least some members (computing nodes 203) of the cluster to retrieve and execute one or more of the multimedia containers 214 (docker) each for processing an associated one of the multimedia objects. The cluster computing framework tasks 212 may execute simultaneously their assigned multimedia containers 214. Each of the multimedia containers 214 may be an instance of a pre-created (offline, in advance) executable image comprising a complete and independent execution environment for one or more multimedia processing algorithms including execution dependencies, libraries and/or the like. The pre-created image may include, for example, an operating system (OS), for example, Linux, a file system, one or more libraries and/or the like.

The multimedia containers 214 may comprise the multimedia processing algorithm(s) execution environment while sharing executed over a host operating system executed by the respective computing node 203 thus making the multimedia containers 214 completely independent of the hardware architecture of the computing node 203. The multimedia containers 214 are file to file oriented meaning that they receive their respective multimedia object as input and output the generated multimedia analytics as a text output further making them independent of the underlying cluster computing framework. The multimedia containers 214 may be created automatically using, for example, a docker file indicating one or more image creation tools which software elements need to be included in the pre-created image according to one or more build parameters, for example, a type of the OS, a type of the file system, a type of the multimedia algorithm(s) and/or the like. The multimedia containers 214 created offline may be stored in a docker registry 220. The docker registry is a stateless, scalable repository that stores the multimedia containers 214 to allow distribution of the multimedia containers 214. The pre-created executable images may allow secure isolated execution of the multimedia container 214 by the platform independent infrastructure of the assigned cluster computing framework task 212. The multimedia processing algorithms may be directed to, for example, image processing, voice processing, speech processing and/or the like. The processing algorithm(s) as well as the library(s) may be provided by $3^{rd}$ party. The multimedia containers 214 (i.e. the pre-created images) and/or the multimedia object(s) may be stored in the cluster's shared storage 220 mapped by the respective pointer in the respective RDD entry.

As shown at 106, each of the cluster computing framework tasks 212 applies the docker operator to retrieve (pull) its assigned multimedia container 214 from the docker registry. The cluster computing framework tasks 212 may use the docker operator to interpret the RDD in order to retrieve the assigned multimedia container 214, the associated multimedia file(s) and/or the like. Using the docker operator, each of the cluster computing framework tasks 212 may retrieve appropriate multimedia container(s) 214 from the docker registry suitable for processing its assigned multimedia object and/or the execution environment of its computing node 203.

In order to execute, one or more of the cluster computing framework tasks 212 may mount the appropriate locations (as indicated by the associated RDD entry) in the shared storage 220 to gain access to one or more of the respective multimedia object file(s), the respective multimedia container 214 and/or the respective libraries supporting the multimedia processing algorithms Optionally, prior and/or as part of the multimedia container 214 execution, the cluster computing framework task 212 may apply the docker operator to interpret the RDD in order to retrieve its assigned multimedia object file(s) to be available for the multimedia container(s) 214. The cluster computing framework task 212 may copy the multimedia object file(s) using, for example, one or more docker volume(s) used to exchange data between the cluster computing framework task(s) 212 and the multimedia container(s) 214. The docker volume may include one or more directories and/or files that are outside of a default Union File System of the multimedia container(s) 214 existing as normal directories and/or files on the host file system of the respective computing node 203.

As shown at 108, each cluster computing framework task 212 initiates execution of its assigned multimedia container 214 to process the associated multimedia object(s). The cluster computing framework task 212 may use the docker operator to execute the multimedia container(s) 214 through the Command Line Interface (CLI) typically provided by the cluster computing framework to interact (communicate) with the processing infrastructure of the cluster computing framework. Each of the multimedia containers 214 may be adapted to include the appropriate CLI commands in order to initiate the multimedia processing algorithm(s) with execution parameter(s) configured according to the processed multimedia object(s). The input for the multimedia processing algorithm(s) is the associated multimedia object(s) while the output may be a textual representation of the results, for example, a text object, a Hyper Text Markup Language (HTML) object, a JavaScript Object Notation (JSON) object and/or the like.

For example, a certain binary file may contain a video clip captured by a camera depicting, for example, a mall main hall. The assigned computing node 203 may execute the respective multimedia container 214 defining the multimedia processing framework defining one or more image processing algorithms that may be provided by $3^{rd}$ party as well as one or more supporting libraries required by the image processing algorithm(s) and the dependencies of each. The image processing algorithm(s) may detect one or more objects, for example, people visiting the mall main hall. The image processing algorithm(s) may further detect a number of male visitors, a number of female visitors and/or a number of children visitors.

The multimedia containers 214 may store the multimedia analytics results in the local storage of the respective computing node 203 and/or at the mounted location of the shared storage 220. As the multimedia container(s) 214 are file to file oriented, each of the multimedia container(s) 214 may output the generated multimedia analytics results to the local storage, for example, the docker volume to be available for the computing framework task 212. This allows each of the cluster computing framework task 212 executed by a respective computing node 203 to access the multimedia analytics results generated by the respective multimedia container(s) 214 executed on the same computing node 203.

As shown at 110, the cluster manager 210 collects (receives) the multimedia analytics results from the cluster computing framework task(s) 212.

As shown at 112, the cluster manager 210 maps the multimedia analytics results back to the RDD. The cluster manager 210 may apply the docker operator to map the results of the multimedia analytics back into the RDD. For example, the apache spark pipe operator may be extended with the docker operator to map the results of the multimedia analytics to the RDD. For example, the number of detected male visitors, female visitors and/or children visitors may be mapped to the standard data representation typically used in the RDD, for example, the textual format. As part of mapping the multimedia analytics results back to the RDD, the cluster manager 210 may copy the multimedia analytics results from the local storage 206 of one or more of the computing nodes 203 executing the cluster computing framework tasks 212 back to the shared storage 220.

Optionally, the multimedia analytics results are mapped back to the RDD by one or more of the respective cluster computing framework tasks 212 executing the respective multimedia containers 214.

In case one or more of the multimedia objects was segmented and/or split to the multimedia segments and/or the multimedia scenes (step 102 of the process 100) respectively, the multimedia analytics results for each of the multimedia segments and/or scenes of each split multimedia object may be aggregated together to produce overall multimedia analytics results for the entire segmented and/or split multimedia object. The multimedia analytics results generated for each of the multimedia segments and/or scenes may be aggregated using the indexing information included in the respective RDD entries assigned to each of the multimedia segments and/or scenes. Aggregating the multimedia analytics results may be done by the cluster manager 210 and/or one or more of the cluster computing framework tasks 212.

Once the multimedia analytics results are mapped in the RDD, the other tools, capabilities and/or functionality of the cluster computing framework may be applied to the multimedia analytics results to generate the big data analytics for the multimedia analytics results. For example, based on the collected multimedia analytics results, the cluster computing framework may generate a distribution of visitors in the mall according to a time of day, a time of week and/or a time of year.

As shown at 114, each of the computing framework tasks 212 removes the local copies of the multimedia object(s) and/or the multimedia analytics results generated by its respective multimedia container(s) 214. For example, the computing framework tasks 212 may delete the multimedia object(s) and/or the multimedia analytics results.

It is expected that during the life of a patent maturing from this application many relevant mobile application methodologies will be developed and the scope of the term mobile application is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of mapping multimedia analytics of multimedia objects into a resilient distributed dataset (RDD), comprising:
    at least one hardware processor adapted to:
        obtain an RDD of a cluster computing framework executed by a cluster comprising a plurality of computing nodes, said RDD comprises a plurality of entries, each of said plurality of entries comprises a pointer to one of a plurality of multimedia objects stored in a shared storage;
        segment at least one of said plurality of multimedia objects to a plurality of overlapping multimedia segments, each of said plurality of multimedia segments having a fixed pre-defined size,
        instruct each of a plurality of framework tasks executed by at least some members of said cluster to apply a docker operator for retrieving and executing one of a plurality of multimedia containers, each of said plurality of multimedia containers is associated with a respective one of said plurality of multimedia objects and comprising a multimedia processing algorithm for processing said respective multimedia object; and
        receive, from said plurality of framework tasks, multimedia analytics results generated simultaneously by said plurality of multimedia containers;
        map said multimedia analytics results into said RDD;
    wherein each of said plurality of multimedia segments is assigned an entry in said RDD and processed by one of said plurality of multimedia containers, wherein said assigned entry is extended to include indexing information of said each multimedia segment with respect to said at least one multimedia object.

2. The computer implemented method of claim 1, wherein said docker operator is an extension added to said cluster computing framework to support generation of said multimedia analytics for said plurality of multimedia objects.

3. The computer implemented method of claim 1, wherein said docker operator is used by a respective one of said plurality of framework tasks to interpret said pointer and copy said respective multimedia object from said shared storage to a local storage of a respective one of said at least some members prior to processing said respective multimedia object such that said respective multimedia object is locally available to said associated multimedia container.

4. The computer implemented method of claim 1, wherein said docker operator is used by a respective one of said plurality of framework tasks to retrieve an appropriate one of said plurality of multimedia containers from a docker registry stored in said shared storage, said appropriate multimedia container is adapted for processing said respective multimedia object.

5. The computer implemented method of claim 1, wherein said docker operator is used for mapping said multimedia analytics results into said RDD using a textual format to allow said multimedia analytics results to be further processed through a processing flow of said cluster computing framework adapted for text objects.

6. The computer implemented method of claim 1, wherein said cluster computing framework is Apache Spark.

7. The computer implemented method of claim 1, wherein each of said plurality of multimedia objects is a member of a group consisting of: an image, a sequence of images, a video clip, an audio playback and a combination of any two members thereof.

8. The computer implemented method of claim 1, wherein each of said plurality of multimedia objects is a binary file.

9. The computer implemented method of claim 1, wherein said pointer is a path in said shared storage.

10. The computer implemented method of claim 1, further comprising said segmenting of said at least one multimedia object is done simultaneously with obtaining said RDD.

11. The computer implemented method of claim 1, wherein multimedia analytics results generated for the plurality of multimedia segments are aggregated using said indexing information to produce overall multimedia analytics results for said at least one multimedia object.

12. The computer implemented method of claim 1, wherein each of said plurality of multimedia containers is an instance of a pre-created executable image and is capable of executing on each of said plurality of computing nodes, wherein said pre-created executable image comprises a complete independent execution environment including all execution dependencies of said multimedia processing algorithm.

13. The computer implemented method of claim 1, wherein each of said plurality of multimedia containers is independent of said cluster computing framework, said each multimedia container operates using a file to file interface in which said each multimedia container receives said respective multimedia object as an input and provides said multimedia analytics as a text output.

14. The computer implemented method of claim 1, wherein said processing algorithm provides a command line interface (CLI) for receiving processing commands embedded in said each multimedia container for said associated multimedia object.

15. A computer implemented method of mapping multimedia analytics of multimedia objects into a resilient distributed dataset (RDD), comprising:
    at least one hardware processor adapted to:
        obtain an RDD of a cluster computing framework executed by a cluster comprising a plurality of computing nodes, said RDD comprises a plurality of entries, each of said plurality of entries comprises a pointer to one of a plurality of multimedia objects stored in a shared storage;
        map said multimedia analytics results into said RDD
        split at least one of said plurality of multimedia objects to a plurality of multimedia scenes created by analyzing a content of said at least one multimedia object and segmenting said at least one multimedia object to said plurality of multimedia scenes according to said content,
        instruct each of a plurality of framework tasks executed by at least some members of said cluster to apply a docker operator for retrieving and executing one of a plurality of multimedia containers, each of said plurality of multimedia containers is associated with a respective one of said plurality of multimedia objects and comprising a multimedia processing algorithm for processing said respective multimedia object; and receive, from said plurality of framework tasks, multimedia analytics results generated simultaneously by said plurality of multimedia containers;

wherein each of said plurality of multimedia scenes is assigned an entry in said RDD and processed by one of said plurality of multimedia containers, wherein said assigned entry is extended to include indexing information of said each multimedia segment with respect to said at least one multimedia object.

16. The computer implemented method of claim 15, wherein multimedia analytics results generated for the plurality of multimedia scenes are aggregated using said indexing information to produce overall multimedia analytics results for said at least one multimedia object.

17. A system for mapping multimedia analytics of multimedia objects into a resilient distributed dataset (RDD), comprising:

a cluster comprising a plurality of computing nodes; and at least one hardware processor adapted for executing code stored in a program store, said code comprising:

code instructions for obtaining an RDD of a cluster computing framework executed by a cluster comprising a plurality of computing nodes, said RDD comprises a plurality of entries, each of said plurality of entries comprises a pointer to one of a plurality of multimedia objects stored in a shared storage of said cluster;

code instructions for segmenting at least one of said plurality of multimedia objects to a plurality of overlapping multimedia segments, each of said plurality of multimedia segments having a fixed predefined size, code instructions for instructing each of a plurality of framework tasks executed by at least some members of said cluster to apply a docker operator added to said cluster computing framework for retrieving and executing one of a plurality of multimedia containers, each of said plurality of multimedia containers is associated with a respective one of said plurality of multimedia objects and comprising a multimedia processing algorithm adapted for processing said respective multimedia object;

code instructions for receiving, from said plurality of framework tasks, multimedia analytics results generated simultaneously by said plurality of multimedia containers executed by said at least some members; and code instructions for mapping said multimedia analytics results into said RDD;

wherein each of said plurality of multimedia segments is assigned an entry in said RDD and processed by one of said plurality of multimedia containers, wherein said assigned entry is extended to include indexing information of said each multimedia segment with respect to said at least one multimedia object.

* * * * *